March 18, 1947.         S. V. DILLON         2,417,741
SPLIT PACKING RING COUPLING
Filed June 24, 1943         4 Sheets-Sheet 1
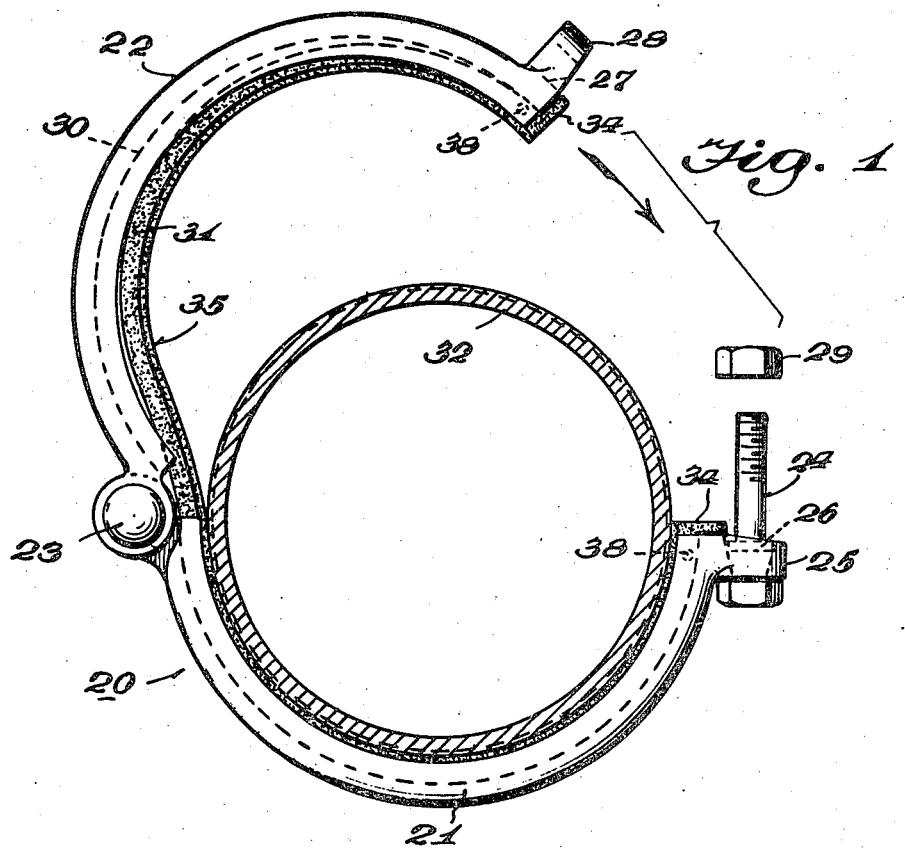
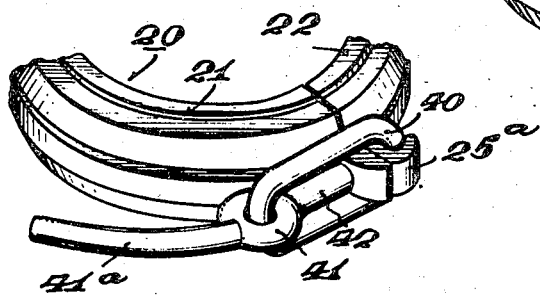
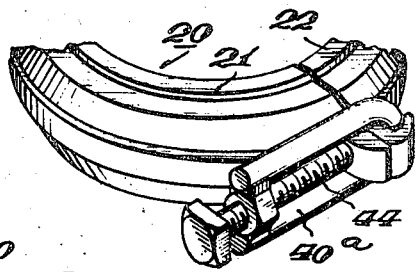
Inventor
Stephen V. Dillon,
By Barry & Cyr
Attorneys

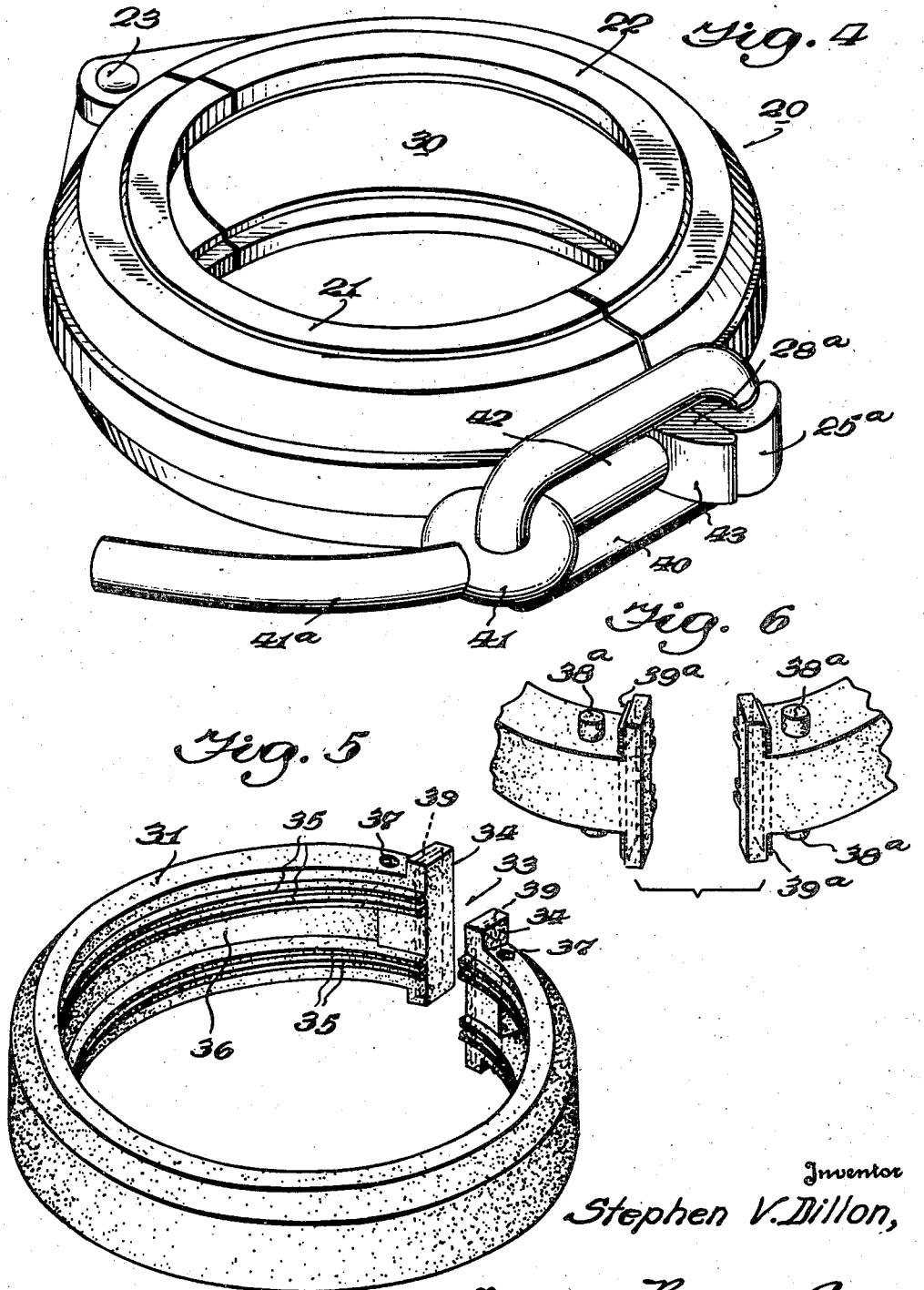

March 18, 1947.  S. V. DILLON  2,417,741
SPLIT PACKING RING COUPLING
Filed June 24, 1943  4 Sheets-Sheet 3

Inventor
Stephen V. Dillon,
By Barry & Cyr
Attorneys

March 18, 1947.　　　S. V. DILLON　　　2,417,741
SPLIT PACKING RING COUPLING
Filed June 24, 1943　　　4 Sheets-Sheet 4
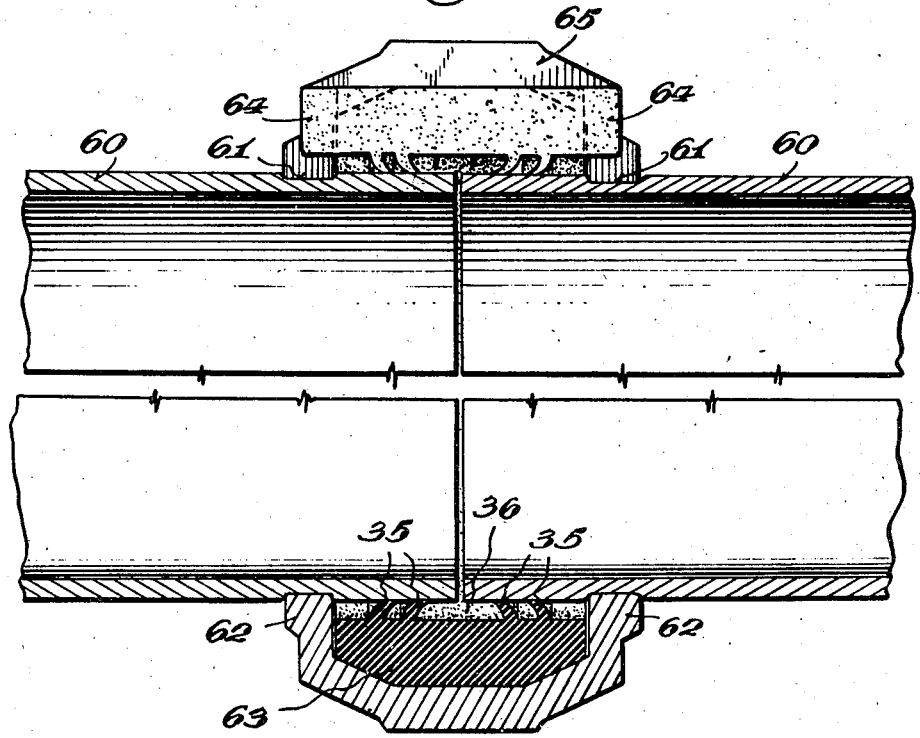
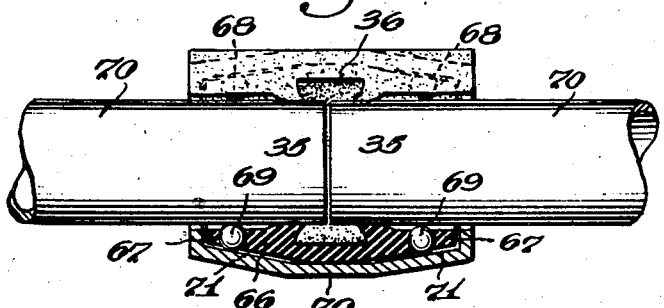
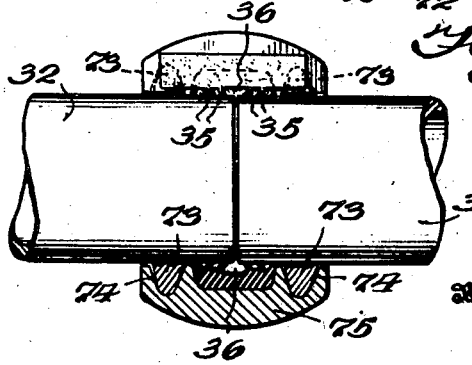
Inventor
Stephen V. Dillon,
By Barry & Cye
Attorneys Patented Mar. 18, 1947

2,417,741

UNITED STATES PATENT OFFICE 2,417,741

SPLIT PACKING RING COUPLING

Stephen V. Dillon, Tulsa, Okla., assignor to Hanlon-Waters, Division of General Finance Corporation, a corporation of Michigan Application June 24, 1943, Serial No. 492,110

3 Claims. (Cl. 285—194)

1

This invention relates to sectional pipe couplings, and more particularly to couplings of the type having a pressure responsive packing or gasket. Heretofore, commercial couplings of that type employed an elastic packing consisting of a continuous or unbroken ring provided with internal annular lips or flanges arranged at opposite sides of an internal groove extending around the inner periphery of the gasket. If such a coupling is used with plain end pipes, the gasket being continuous, conceals the pipe ends and great difficulty and damage have been caused in properly fitting the packing on adjacent pipes. If the coupling is employed with grooved pipe, the operator frequently is unable to see whether the gasket flanges are properly spaced on the adjacent pipe ends or if a part of one or the other side edges of the gasket has entered a groove or grooves of the pipes, and this has resulted in leaky or ruptured joints and necessitated replacement of the gasket. In other words, misapplication of the gasket on grooved pipe by an operator improperly aligning an edge or the edges of the gasket relatively to the pipe grooves, makes the housing when installed on the gasket, mutilate the latter. Replacement of the gasket is a handicap, especially at the present time, as rubber and the like are scarce and expensive.

Furthermore, pipe lines are frequently laid below the ground surface and covered with dirt, etc., and if a leak should occur at a coupling point in the line, the present-day couplings have other disadvantages, because the gasket being an unbroken ring could only be replaced by digging a long trench along the pipe line and then shifting at least one section of pipe to permit a new gasket to be slipped onto the end thereof and then be moved axially to engage the end of an adjacent pipe. Moreover, in couplings of this character the parts are more or less loosely assembled when carried in stock or while being transported or installed, resulting in the loss or misplacement of parts.

The main object of the present invention is to eliminate such disadvantages and to supply a coupling of simple durable construction which may be installed speedily and properly by an unskilled workman even in darkness, under water or below ground.

Another object is to furnish a coupling which may be speedily removed when necessary, an essential desideratum especially when the coupling is used with pipes conveying concrete or other material which sets or hardens. Removability is also essential when there is a failure of a pump or the like supplying the line or when an obstruction prevents free passage of materials through the line.

A further object is to provide a coupling employing a stronger gasket, because the coupling includes mechanical means for manipulating the gasket, whereas the gaskets heretofore used had to be relatively weak as they had to be manipulated by hand.

Another purpose is to supply a coupling especially adapted for thin walled pipes which may have their ends specially shaped, say in the field by simple inexpensive tools, so as to cooperate with the coupling. The resulting joint will permit flexing of the pipe sections without breaking the seal or allowing the sections to be pulled from the coupling.

A still further object is the provision of a coupling which, in one form, may be used to stop a leak, by covering a hole, crack or the like in a pipe.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Figure 1 is a side elevation of a hinge type coupling in accordance with the invention and with the housing in open position and partially embracing the pipes.

Fig. 2 is a fragmentary perspective view of a coupling of this type but showing a housing latch used instead of a bolt.

Fig. 3 is a similar view illustrating another form of latch.

Fig. 4 is a perspective view of the housing with one form of the latch.

Fig. 5 is a similar perspective view of a modification of the gasket.

Figure 6 is a still further partial perspective view of a modification of the gasket, showing especially the end structure.

Fig. 10 is a longitudinal sectional view of one form of the coupling shown applied to grooved end pipes.

Fig. 11 is a similar view of another form of the coupling shown applied to pipe ends and in which the gasket is combined with ball retainers, carrying balls adapted to be wedged into locking engagement with the pipes.

Fig. 12 is a view similar to Fig. 11, but showing the gasket used with a coupling of the type having rockable pawls or dogs which grip the pipes.

Figure 7:
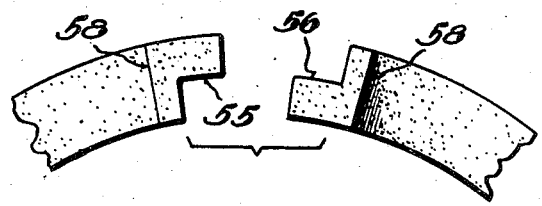
Figs. 7 and 8 are fragmentary side elevations of other modifications of the gasket.

In the embodiment of the invention illustrated in Figs. 1 and 5, 20 designates a housing (usually metal, cast or drop forged) consisting of jaws or semi-circular sections 21 and 22 having adjacent ends hingedly connected together at 23. The opposite ends of the jaws may be connected together by any suitable means; for example, a bolt 24 may be secured to a lug 25 of one jaw by a bolt retainer 26, and said bolt will be received in an aperture 27 of a lug 28 of the other jaw. A nut 29 will be used on the bolt to force the lugs toward one another.

The housing is preferably provided with an internal circular groove 30 to receive an elastic gasket 31 (Fig. 5) of resilient rubber or the like. Such gasket in normal condition has an outside diameter less than the largest diameter of the groove 30, so that it may be stretched circumferentially about the adjacent ends of pipes 32. From Fig. 5, it will be noted that the gasket is split, as indicated at 33, and its ends are provided with shoulders 34 or the like to abut against the housing lugs 25 and 28, respectively, so that the latter when moved toward one another may function to stretch the gasket and force the ends thereof into sealing contact with one another, and the gasket per se into sealing engagement with the pipes, when the nut 29 is tightened on the bolt.

As is usual in pressure responsive packing rings, spaced lips or flanges 35 extend inwardly toward the axis of the ring, at opposite sides of a groove 36 which communicates with the gap between the pipe ends.

In order that the coupling will be unitary, the gasket may be provided with depressions 37 to receive pins 38 used to detachably secure the end portions only of the packing to the housing.

For reinforcing purposes, a stiff insert 39 of metal or the like may be embedded in the shouldered ends of the gasket parallel to the axis thereof, to receive the pressure exerted by the lugs of the housing. If desired, the reinforcing inserts may extend through the gasket, as shown at 39ª in Fig. 6 and form backings for the shouldered ends of the gasket.

Instead of retaining the gasket in the housing by the parts 37 and 38, it is obvious that the gasket (Fig. 6) could be provided with projections 38ª to enter holes (not shown) in the housing.

In place of a bolt which usually requires a separable nut, I may use a latch which may be permanently or detachably connected to the housing. For example, in Fig. 4, the housing lug 25ª may be in the form of a hook or eye to serve as a fulcrum for one end of a yoke 40, the opposite end of which is pivotally secured to a ring 41 having a rigidly connected handle projecting in one direction, and a rigidly connected finger 42 extending in the opposite direction. The finger slidably engages a cam surface 43 of the other lug 28ª of the housing. It will be clear from Fig. 4, that manipulation of the handle will serve to either open or close the latch.

In the modification shown in Fig. 3, the latch is adjustable and a screw 44, threaded to the yoke 40ª, is substituted for the ring, handle and finger.

Figure 9:
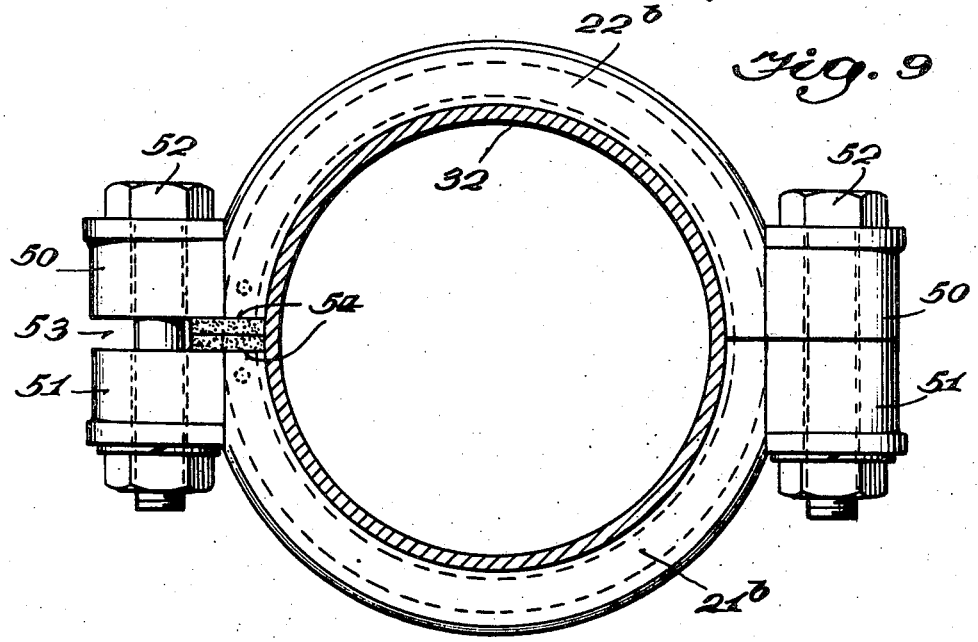
Fig. 9 is an elevational view of another form of the coupling in which the housing sections are bolted together, the coupling being shown on the pipes.

In the embodiment shown in Fig. 9, the housing sections 21ᵇ and 22ᵇ are, respectively, provided with apertured ears 50 and 51 for the reception of bolts 52 which, if desired, may be secured to the ears 50 by any suitable retaining means, such as is illustrated in Fig. 1.

In this embodiment, the ears at one side of the coupling contact with one another when the coupling is in place on the pipes, while the ears at the opposite side are spaced apart, as indicated at 53. The shouldered ends 54 of the gasket are arranged in this space and, of course, are held in sealing contact by means of the ears at that side of the coupling.

Figure 8:
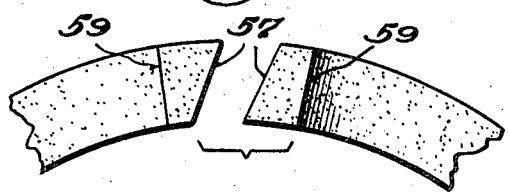

In the preferred form of gasket illustrated in Fig. 5, the ends of the gasket are in planes. Instead of making them in this way I may make them step-shape, as indicated at 55 and 56 in Fig. 7, or on angles, as indicated at 57 in Fig. 8. In either event shoulders 58, 59 will be provided at the end portions of the ring to be contacted by the ears or lugs of the housing.

As shown in Fig. 10 this type of coupling is well adapted for use with pipes 60 having external grooves 61 near the ends thereof. In this embodiment, the housing is provided at opposite sides with annular flanges 62 to enter the grooves, and each end of the gasket 63 is provided with lateral wings 64 engaged by opposite ends 65 (only one of which is shown) of the housing, employed in stretching the gasket and holding its ends in contacting relation. It will be manifest to those skilled in the art that a coupling of this character could also be used with thin walled pipe having flared or turned-back ends.

In Fig. 11 the invention is shown in combination with a ball grip type coupling in which the split gasket 66 is integral with ball retainers 67 having apertures 68 for the balls 69 which extend therethrough. The balls are adapted to grip the pipes 70 and they are wedged into gripping relation by tapered surfaces 71 within the housing 72. Of course, the housing is sectional and has adjacent ends which force the adjacent ends of the gasket toward one another and act to stretch the gasket.

It is evident that other types of gripping means may be employed in lieu of the balls 69. For example, in Fig. 12 I have illustrated pivoted or rocking pawls 73 which, in this instance, are rockably arranged in cavities 74 within the sectional housing 75.

From the foregoing it is believed that the invention may be readily understood by those skilled in the art, and it will be manifest that changes may be made in the details disclosed without departing from the spirit of the invention as expressed in the following claims.

What I claim is:

1. A device of the character described comprising a transversely split ring-shaped one-piece elastic gasket designed to embrace piping, and a sectional annular housing surrounding the gasket and having sections arranged end to end and adapted to engage the end portions of the gasket and force them toward one another, the portion of the gasket between its end portions being free to slide relatively to the housing, and the end portions of the gasket being provided with shoulders forming abutments for the housing.

2. A pipe coupling comprising an annular housing consisting of a plurality of sections so connected that an end portion of one section can move toward and away from an end portion of an adjacent section, said housing having an internal groove, and a ring-shaped one-piece elastic gasket extending into the groove and having adjacent end portions detachably anchored to said end portions of the housing sections to move the ends of the gasket toward the place where the housing sections are connected, the outside diameter of the gasket being materially less than the largest diameter of the groove and the portion of the gasket between its ends being stretchable and slidable in said groove.

3. A pipe coupling comprising an annular housing consisting of a plurality of sections so connected that an end portion of one section can move toward and away from an end portion of an adjacent section, said housing having an internal groove, and a ring-shaped one piece elastic gasket extending into the groove and having adjacent end portions anchored to said end portions of the housing sections to prevent movement of the ends of the gasket toward the place where the housing sections are connected, the outside diameter of the gasket being materially less than the largest diameter of the groove and the portion of the gasket between its ends being stretchable and slidable in said groove.

STEPHEN V. DILLON.

REFERENCES CITED

The following references are of record in the file of this patent:

UNITED STATES PATENTS

| Number | Name | Date |
| --- | --- | --- |
| 2,009,046 | Fons | July 23, 1935 |
| 447,818 | Gerstung | Mar. 10, 1891 |
| 948,772 | Shepard | Feb. 8, 1910 |

FOREIGN PATENTS

| Number | Country | Date |
| --- | --- | --- |
| 319,582 | British | Sept. 26, 1929 |